March 21, 1933. J. A. STREUN 1,902,675
CONVEYER FOR COTTON
Filed April 3, 1931 2 Sheets-Sheet 2

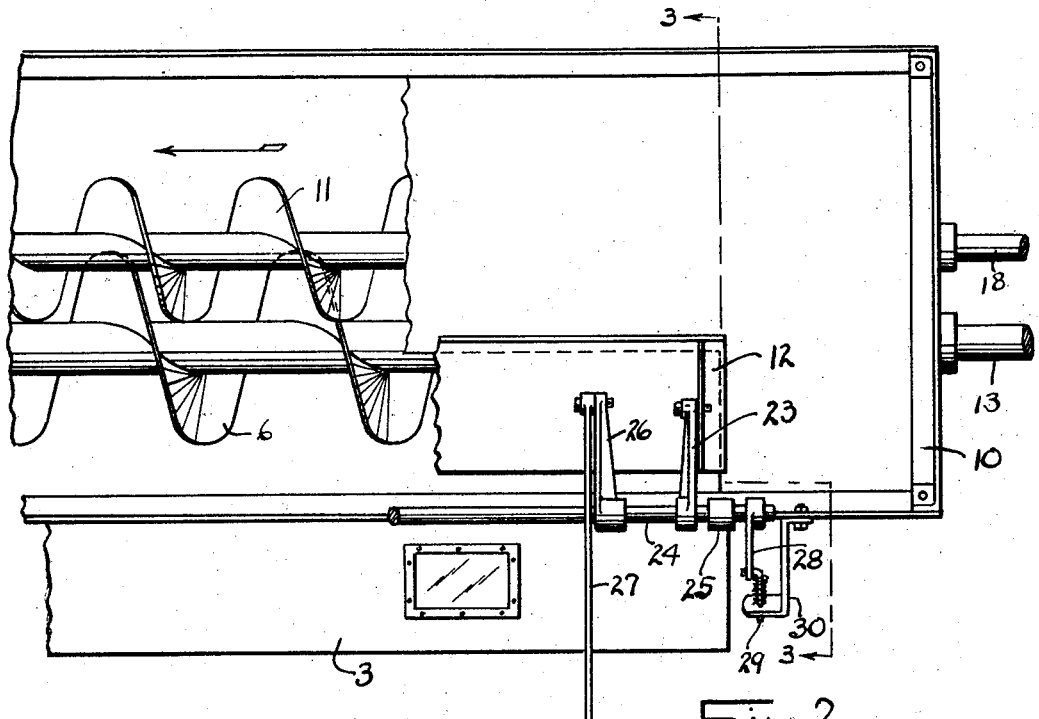
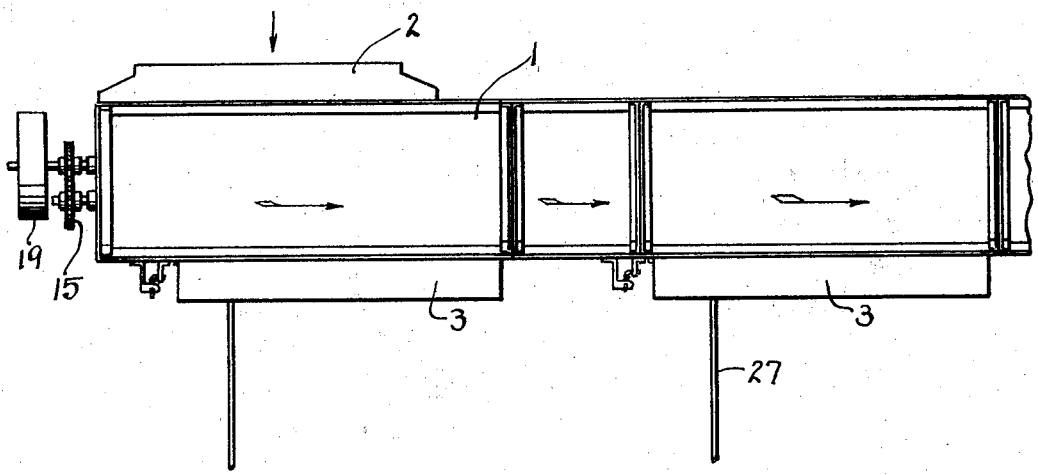

John A. Streun Inventor

Jesse R. Stone
&
Lister B. Clark
By
Attorneys

Patented Mar. 21, 1933

1,902,675

UNITED STATES PATENT OFFICE

JOHN ARNOLD STREUN, OF SHERMAN, TEXAS, ASSIGNOR TO HARDWICKE-ETTER COMPANY, OF SHERMAN, TEXAS

CONVEYER FOR COTTON

Application filed April 3, 1931. Serial No. 527,457.

My invention relates to conveyers adapted to move seed cotton to the gins.

In the ginning of cotton it is common to provide a plurality of gins operated from one source of power making up a line or battery of ginning machines, all of them adapted to operate upon the same lot of cotton. A conveyer is arranged to move the cotton above the gins and feed the same into the hoppers of the gins by gravity. The common type of conveyer most generally used is a belt conveyer although screw conveyers have been also used.

One difficulty with the ordinary conveyer is that it does not maintain the housing of the conveyer free of cotton when it has ceased operating. The cotton comes to the gins in loads from different producers. A farmer bringing in the load of cotton wants his cotton ginned separately from that of others and it is desirable to be able to feed the cotton in each load separately to the gins and to leave the conveyer free of cotton when the load has been entirely passed to the conveyor.

It is an object of my invention to provide a conveyer which will maintain itself clear of cotton quickly after the cotton supplied to the conveyer has been moved to the gin.

It is also an object to provide a conveyer having means to close off a supply of cotton to any particular gin or to all the gins if desired in a convenient and effective manner.

I also contemplate the use of means in connection with my controlling device for feeding the cotton to the gins which will automatically hold the control device in either open or closed position.

It is a further object of the invention to provide a plurality of conveyers within the conveying chute, which together co-operate to carry the cotton most effectively through the device.

In the drawings herewith Fig. 1 is a broken side elevation of a conveyer embodying the invention.

Fig. 2 is an enlarged and broken front view showing the manner in which the valves are operated.

In Fig. 1 I have shown a conveyer as comprising an elongated trough or housing 1 having at the forward end thereof a hopper 2 to which the cotton is fed from the wagon or bin in which the cotton is received.

This conveyer is arranged to supply the cotton to a plurality of gins and on the lower side thereof are shown outlet chutes 3, 3, which conduct the cotton from the chute to the gins not shown.

Figure 3:
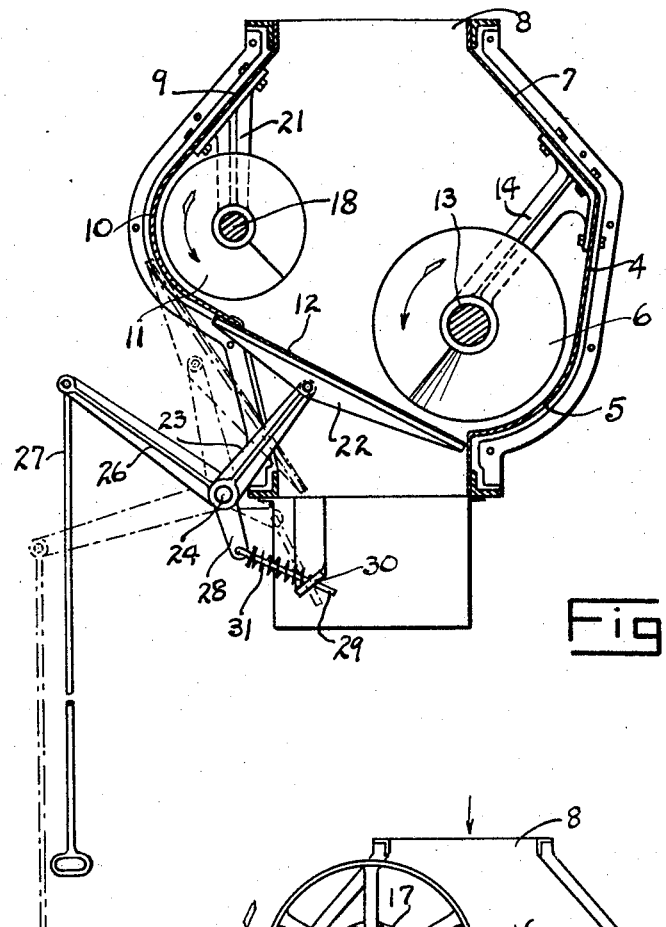
Fig. 3 is a transverse section on the plane 3—3 of Fig. 2.
Figure 4:
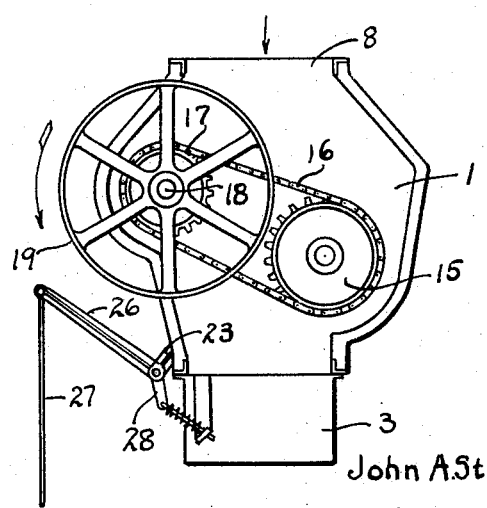
Fig. 4 is an end view of the conveyer at the forward end thereof.

With reference particularly to Fig. 3, it will be seen that the housing or trough of the conveyer is made up of a side wall 4, which I term the rearward side wall, said wall being curved around the lower side at 5 to correspond to the curve of the screw conveyer 6 adapted to work within the housing.

Toward the upper side of the wall the same is inclined inwardly to some extent at 7 leading to the inlet opening 8 at the upper end. On the opposite side there is an inclined wall 9, which is curved at 10 to correspond with the curvature of the conveyer 11 adjacent thereto. Below the curved portion is an inclined floor leading down to the curved portion 5 on the rearward side of the trough. In Fig. 3 the floor is shown as composed of a valve or door member 12. I have shown these walls as being made up of sheet metal but obviously they may be made of any preferred material.

Within the trough or housing are the conveyers 6 and 11 previously referred to. The conveyer 6 is a screw conveyer formed upon a shaft 13 extending longitudinally of the conveyer and supported at its ends in brackets 14 secured to the side wall and extending inwardly at an inclined position and having its inner end formed into a bearing for said shaft. At the inlet end of the conveyer the shaft projects through the housing and is formed with a sprocket wheel 15 thereon, which is operated through a sprocket chain 16 connected with a sprocket 17 upon a shaft 18 having a pulley or other connection 19 thereon.

Above and to one side of the conveyer 6 is a smaller conveyer 11 mounted upon a shaft 18 supported by the bracket 21, mounted on the side wall of the housing adjacent the end thereof. This shaft is the power shaft having the pulley 19 thereon as previously noted.

Attention is now called to the inner shape of the conveyer. The larger conveyer 6 is on the lower side and is spaced closely to the bottom of the trough so that it will carry along through the conveyer all of the material which is fed to the conveyer. In previous devices agitators have been used in connection with a conveyer of this type but I employ a screw conveyer 11 in conjunction with the larger conveyer and spaced a suitable distance from the other conveyer so as to carry between the two conveyers a plentiful supply of seed cotton. The upper conveyer moves the cotton longitudinally of the trough but also moves it downwardly along the inclined floor of the trough toward the larger conveyer as will be obvious.

It is sometimes desirable for purposes of repair or otherwise that certain of the gins be not operated when the others are working. I, therefore, provide a valve 12, previously noted, which may close the opening leading to the discharge chutes 3 to the various gins. This valve 12 is a plain rectangular member having adjacent each end an outwardly extending web or plate 22 thereon, to which is pivoted a lever 23. The valve member is shaped to completely close the discharge opening in the floor of the chute and is arranged to be moved to and from closed position in said opening.

The lever 23 is mounted upon a shaft 24 which is mounted for rotation in bearings 25 in the lower side of the housing. The lever 23 is fixed to the shaft and is rotatable therewith. Fixed upon the shaft is a crank arm 26 projecting from the shaft approximately at right angles to the position of the lever 23 and connected at its outer end to a rod or handle 27 which hangs downwardly within the reach of the operator. To hold the shaft in position with the valve either open or closed, I arrange upon the shaft 24 a short arm 28 extending from the shaft in a normally downward direction, as shown in Fig. 3. The end of the shaft has an opening therein to receive a rod 29, which extends through an opening in a plate 30 secured at its upper end to the frame of the housing. Between the plate 30 and the end of the arm 28 is a spiral spring 31, which is under compression and tends to exert a thrust against the end of the arm 28. The plate 30 is at such an angle to the arm and the shaft 24 that a toggle effect is formed, tending to hold the arm 28 at either side of a straight line connecting the shaft 24 and the opening in the plate 30. Thus when the arm 28 is swung to either side of said straight line the thrust of the spring 31 will tend to hold it in that position. As seen particularly in Fig. 3, a pull upon the rod 27 by the operator will move the crank arm 26 into the dotted line position and throw the lever 23 to the left into the dotted line position, leaving the discharge chute open. The spring 31 will then tend to hold the valve open. A thrust upwardly on the rod 27 will likewise tend to close the valve and the spring will tend to hold it in that position.

The advantages of my device lie in the particular arrangement of the two conveyers and the shape of the floor and side walls of the conveyer whereby all of the cotton fed to the trough will be moved effectively throughout the length of the conveyer and to the discharge openings leading to the gins. It will be possible, if desired, to close all of the valves or doors 12 so that the cotton may be moved through the conveyer and be discharged beyond the gins and again fed through the same route so as to air and dry the cotton before the valves are opened to allow the same to be fed to the gins. Likewise, any individual gin may be shut off as desired. The arrangement whereby the conveyer clears itself readily of all cotton enables the operator to clean up one batch or lot of cotton, leaving no remains whatever within the conveyer, and thus when the second load of cotton is fed to the conveyer it will not be mixed or contaminated with the cotton of any other grower. The further advantages will be apparent to those skilled in the art.

Having described my invention, what I claim is:

1. A plurality of cotton machines, a conveyer for cotton above said machines, including a trough having its floor inclined to one side thereof, hopper openings in said floor to discharge cotton to said machines, a large screw conveyer in the lower side of said trough and at the downward edge of said floor, a smaller conveyer at the upper edge of said floor at the opposite side above said large conveyer and means in said openings and forming a part of said floor to control the passage of cotton therethrough.

2. A plurality of cotton machines, a conveyer for cotton above said machines, including a trough having its floor inclined to one side thereof, hopper openings in said floor to discharge cotton to said machines, a large screw conveyer in the lower side of said trough and at the downward edge of said floor, a smaller conveyer at the upper edge of said floor at the opposite side above said large conveyer, said conveyers being adapted to rotate in the same direction, said large conveyer being close to the floor and side wall of said trough to convey away all the cotton therefrom, and means in said openings forming a part of said floor to control the passage of cotton therethrough.

3. A conveyer for cotton including an elongated trough, conveying means therein, a laterally inclined floor in said trough, said floor having spaced discharge openings therein, valves shaped to close said openings, a valve lever, at one end of which said valve is pivoted, a shaft to which said lever is fixed, a crank lever fixed to said shaft and adapted to rotate said shaft, a support for said shaft, and a spring connected with said shaft acting to hold said levers in position to either open or close said valve.

4. A conveyer for cotton including an elongated trough, conveying means therein, a laterally inclined floor in said trough, said floor having spaced discharge openings therein, valves shaped to close said openings, and form a part of said inclined floor, a support below each of said valves, a shaft thereon, a crank lever on said shaft, valve levers secured to said shaft and said valves and a spring connected with said shaft to hold it in either of the adjusted positions.

5. A conveyer for cotton, including an elongated trough, conveyers therein to move seed cotton along said trough, a laterally inclined floor in said trough having discharge openings therein, valves shaped to close said openings, levers pivoted to said valves and means to operate said levers to move said valves to and from position to close said openings and means to retain said valves in either open or closed position.

6. A conveyer to move cotton to a plurality of cotton machines, comprising a trough having one side extended lower than the other and curved outwardly to receive a conveyer, the opposite side being on a higher level and also curved outwardly, an inclined floor connecting said sides, a larger conveyer adjacent said lower side, a smaller conveyer spaced from said larger conveyer adjacent said higher side, said conveyers being rotatable in the same direction to carry the cotton between them, and valves forming part of said inclined floor to close outlet openings in said trough.

7. A conveyer to move cotton to a plurality of cotton machines, comprising a trough having one side extended lower than the other and curved outwardly to receive a conveyer, the opposite side being on a higher level and also curved outwardly, an inclined floor connecting said sides, a larger conveyer in the lower portion of said trough, a smaller conveyer spaced from said larger conveyer adjacent said higher side, said smaller conveyer being rotatable to urge the cotton downwardly along said inclined floor upon said larger conveyer, said floor having openings therein and valves controlling said openings.

8. A conveyer for cotton including an elongated trough one side of which has its lower portion curved downwardly, a floor to said trough inclined from the opposite side downwardly toward said curved portion, spaced discharge openings in said floor, a lower screw conveyer in said trough positioned closely adjacent said curved portion, a second conveyer adjacent the opposite wall and adjacent the upper edge of said floor, said conveyers being rotatable in the same direction to carry the cotton between them along said inclined floor, valves adapted to close discharge openings in said floor and means to swing said valves to open or closed position.

In testimony whereof I hereunto affix my signature this 25th day of March, A. D. 1931.

JOHN ARNOLD STREUN.